(12) United States Patent
Waese et al.

(10) Patent No.: US 6,286,031 B1
(45) Date of Patent: Sep. 4, 2001

(54) SCALABLE MULTIMEDIA DISTRIBUTION METHOD USING CLIENT PULL TO RETRIEVE OBJECTS IN A CLIENT-SPECIFIC MULTIMEDIA LIST

(76) Inventors: Jerry Richard Waese, 144 Hameton Avenue, Toronto (CA), M4K 2Z1; Mark Sinclair Krebs, 54 Grandview Avenue, Toronto (CA), M4K 1J2

( * ) Notice: Subject to any disclaimer, the term of this patent is extended or adjusted under 35 U.S.C. 154(b) by 0 days.

(21) Appl. No.: 09/233,911

(22) Filed: Jan. 21, 1999

(51) Int. Cl.[7] .................................................. G06F 15/16

(52) U.S. Cl. ......................... 709/203; 709/204; 709/232

(58) Field of Search ................................... 709/203, 208, 709/217–219, 231–232, 235, 311, 319–320, 315–316, 204–205; 345/335, 972, 329; 707/501, 513, 901

(56) References Cited

U.S. PATENT DOCUMENTS

| | | | | |
|---|---|---|---|---|
| 5,557,320 | * | 9/1996 | Krebs ..................................... | 348/12 |
| 5,594,911 | * | 1/1997 | Cruz et al. ............................ | 709/204 |
| 5,761,416 | * | 6/1998 | Mandal et al. ....................... | 709/250 |
| 5,768,513 | * | 6/1998 | Kuthyar et al. ...................... | 709/204 |
| 5,809,512 | * | 9/1998 | Kato ..................................... | 707/502 |
| 5,813,014 | * | 9/1998 | Gustman ............................... | 707/103 |
| 5,815,663 | * | 9/1998 | Uomini ................................. | 709/219 |
| 5,828,840 | * | 10/1998 | Cowan et al. ........................ | 709/203 |
| 5,918,012 | * | 6/1999 | Astiz et al. ............................ | 709/217 |
| 6,073,727 | * | 6/2000 | DiFranza et al. .................... | 187/396 |
| 6,141,001 | * | 10/2000 | Baleh ................................... | 345/302 |
| 6,161,137 | * | 12/2000 | Ogdon et al. ........................ | 709/224 |
| 6,175,862 | * | 1/2001 | Chen et al. ........................... | 709/218 |
| 6,219,704 | * | 4/2001 | Kim et al. ............................. | 709/224 |

OTHER PUBLICATIONS

Postel, J., Simple mail Transfer Protocol, RFC 821, pp. 1–8, Aug. 1992.*

Milestone I Report for ALT ANAST Project, http:..www-.neoncrunch.on.ca/canarie/milestone.htm, pp. 1–6, Nov. 2000.*

(List continued on next page.)

*Primary Examiner*—Zarni Maung
*Assistant Examiner*—Andrew Calwell (57) ABSTRACT

A method for broadcasting a scalable multimedia presentation over the Internet is disclosed. In a specific embodiment, a broadcasting server creates a multimedia list on a per broadcast per recipient basis. The multimedia list includes references to the objects (e.g., URLs) rather than the objects themselves. The broadcasting server transmits the multimedia list to a recipient system. The recipient system runs the multimedia list by retrieving each object on the multimedia list from one or more proxy webservers. The recipient computer enters an availability state associated with an object when it begins to receive the object. For each object, the recipient computer reports an indication of this availability state to the broadcasting server via the proxy webserver. The recipient then displays the objects. The broadcasting server uses the indications of the recipient availability states to load balance the system. The broadcasting server may initiate an object handoff process causing objects to be moved to an appropriate proxy webserver. The broadcasting server may assign clients to specific proxy webservers by appropriately generating references in the multimedia lists. Multimedia list objects may include image, sound, video, HTML, and executable files. Multiimedia list objects also include applets, programs executable on a server, and timers for controlling the display duration of each object.

19 Claims, 11 Drawing Sheets

OTHER PUBLICATIONS

High Quality Video Transfer That Does Not Require QOS, http://www.canarie.ca/MLISTS/testnet/1309.html, pp. 1–2, Aug. 1999.*

Neon Crunch "ALT" Movies–on–Demand, http://www.neon-crunch.on.ca, pp. 1–2, Mar. 2001.*

Canarie ALT ANAST Project, http://www.neon-crunch.on.ca/canarie/default.html, pp. 1–7, Mar. 2001.*

Liao, T., "WebCanal: A Multicast Web Application," Comp. Networks and ISDN Systems, vol. 29, Nos. 8–13, pp. 1091–1102, Sep. 1997.*

Parnes, P. et al., "The mWeb Presentation Framework," Comp. Networks and ISDN Systems, vol. 29, Nos. 8–13, pp. 1083–1090, Sep. 1997.*

* cited by examiner

```
<META HTTP-EQUIV="REFRESH" CONTENT="14 ;
URL=http://xhref.command/?downloadplay?
file://c:\NeonCrunch\BigButton\Pictures\PortJoli.sli">
```

SCALABLE MULTIMEDIA DISTRIBUTION METHOD USING CLIENT PULL TO RETRIEVE OBJECTS IN A CLIENT-SPECIFIC MULTIMEDIA LIST

FIELD OF INVENTION

The invention relates to Internet broadcast systems and methods, specifically to the broadcast of multimedia data on the Internet.

BACKGROUND OF THE INVENTION

The current methods of distributing multimedia data over the Internet are quality constrained by existing bandwidth, or involve website downloads through specific file transfer and client requests.

The currently favoured broadcast method is the technique commonly referred to as "bit-streaming" is used to distribute multimedia data through a continuous bit-streamed broadcast, which, in more sophisticated multicast techniques, such as MBONE, where a single copy of the data is broadcast to all receivers at once, thus obtaining significant economies of bandwidth. This technique is particularly appropriate to video broadcasts where the broadcaster uses a "push" server application program to transmit common Hypertext Transfer Protocol (HTTP) or proprietary Internet Protocol (IP) based bit-streaming to the Internet browsers of all recipients. Alternatively, non-broadcast methods can be used. Multimedia can be downloaded as data file through an ad hoc "pull" (user determined interaction) approach using HTTP from a website by an Internet user requesting a specific browser download of a specific multimedia file from an Internet server website. Large data files can also be transmitted to or from remote hosts, or between remote hosts, using File Transfer Protocol (FTP), which issues commands telling, what to transfer and where it may be sent over different connections. In both cases. continuous multimedia becomes only experienced in a playback mode, once the requested multimedia file has been received by the client.

Multimedia files can also be transmitted using Simple Mail Transfer Protocol (SMTP) for e-mail. SMTP is independent of the particular transmission subsystem and requires only a reliable ordered data stream channel. E-mail, however, is transmitted from a Sender-SMTP host to a Receiver-SMTP host, or from one server directory to another. Subsequent to the receipt of e-mail, the individual client receiver is again required to download, via FTP, e-mail from a Receiver host directory, or "mailbox", to the client workstation.

In U.S. Pat. No. 5,828,840 Cowan et al., a client initiates a connection with a server, and the server responds to the request for connection by transmitting a message back to the client to determine whether the client is a network terminal or not. The client responds with a message that is received by an application dispatcher at the server which takes one of a pair of actions based on whether the client is a network terminal. If the client terminal is a network terminal, then the application dispatcher spawns a server application in the server which responds to the client application in the client. Going forward, the server application responds to all future requests from the client application. If the client is not a network terminal, then the application dispatcher initiates a client application in the server to service the client terminal application requirements. Requests from the client application on behalf of the client terminal are subsequently serviced by a server application at the server which communicates to the client terminal via the client application at the server. Client/network server messaging is defined by respective processes to maintain ongoing communication controls which are not related to processing capabilitiesor data identification.

U.S. Pat. No. 5,815,663 Uomini, provides a system for news network management which allows a poster to post an article which might comprise multiple component files of varying types combined in the article by hypertext references in a posted message. The posted message can either be any browser, indexing server, archive server, tertiary storage manager, or method player component. Thus, system components supplied by multiple vendors can be interconnected to form a multimedia system that communicates using the generalized interfaces of the invention. A browser component can accept input such as search requests and display multimedia data. An indexing server component includes a data catalogue that catalogues multimedia data. The catalogue can be used to identify catalogue elements associated with data that can satisfy a search request. A search mechanism is used to identify the desired multimedia data. A search mechanism can create additional catalogues that are a subset of the catalogue provided on the indexing server. An archive server identifies a tertiary storage manager that manages the store containing the multimedia data. The tertiary storage manager retrieves the corresponding multimedia data from its store and sends it to a method play which plays it in a display region of the browser. The invention retains the content and results of a search such that it is only necessary to perform a search once. Search elements are used to store the content of a search, i.e. search criteria. A segment element is used to store the results of a search. The object of the invention is to solve one or more of the drawbacks in existing methods discussed above, or to provide other improvements to the art.

In U.S. Pat. No. 5,768,513 Kuthyar et al. a communications system uses an Internet server to provide multimedia messaging functions over the Internet. Multimedia workstations are interconnected via the public switched telephone network (PSTN). Parties are provided with multimedia mailboxes on message servers that are connected to t the PSTN and the Internet. In order to identify the message server on which a called party's mailbox is located, the Internet server provides the number of the called party. When a multimedia call is unanswered, the system uses the multimedia number of the message server and the called party multimedia number provided by the Internet server to record and store a message for the called party in the called party's mailbox.

In U.S. Pat. No. 5,761,416 Mandel et al., a video server allows for additional output bandwidth from the server by using multiple physical network interfaces over a single IP subnetwork. This approach is particularly well suited for use with video servers that store and deliver multimedia bit streams but allowing all clients to share the same subnetwork with the server. In this manner, the bandwidth from each of the physical network interfaces can be combined as needed and assigned as needed in service to any plurality of destinations in the network, allowing all bandwidth to be available for use with one or more clients.

In U.S. Pat. No. 5,809,512 Kato, an information provider apparatus, enables a user to employ hyperlink selection from a displayed hypertext data page to obtain and play the contents of specific sets of multimedia data which are held in a data storage device, executing control of playing of a set based upon elapsed frame numbers of a video clip which forms part of the set, in conjunction with scenario data which have been predetermined for the set. The apparatus can be used in a network in which users of various client terminals can access multimedia data stored at a server computer, or can exchange electronic mail items each consisting of a set of multimedia data in conjunction with corresponding scenario data, or can post messages on a "notice board" hypertext page at the server computer, each message consisting of a set of multimedia data and corresponding scenario data, with other users of the network being able to access the posted messages by browsing selection. This invention specifically pertains to downloading and playing video files and downloading other scenario data from a webserver through a browser.

U.S. Pat. No. 5,813,014 Gustman, is a generalized solution for management of multimedia assets. Generalized interfaces are used between a browser component, indexing server, archive server, tertiary storage manager, and method player components. The generalized interface defines a communication protocol that can be used by any browser, indexing server, archive server, tertiary storage manager, or method player component. Thus, system components supplied by multiple vendors can be interconnected to form a multimedia system that communicates using the generalized interfaces of the invention. A browser component can accept input such as search requests and display multimedia data. An indexing server component includes a data catalogue that catalogues multimedia data. The catalogue can be used to identify catalogue elements associated with data that can satisfy a search request. A search mechanism is used to identify the desired multimedia data. A search mechanism can create additional catalogues that are a subset of the catalogue provided on the indexing server. An archive server identifies a tertiary storage manager that manages the store containing the multimedia data. The tertiary storage manager retrieves the corresponding multimedia data from its store and sends it to a method play which plays it in a display region of the browser. The invention retains the content and results of a search such that it is only necessary to perform a search once. Search elements are used to store the content of a search, i.e., search criteria. A segment element is used to store the results of a search.

The object of the current invention is to solve one or more of the drawbacks in existing methods discussed above, or to provide other improvements to the art.

SUMMARY OF THE INVENTION

The invention relates to Internet broadcast systems and methods, specifically to the broadcast of multimedia data on the Internet. In a first aspect the invention provides a method of broadcasting multimedia data to online Internet recipients where the multimedia data is not broadcast as a continuous bit-stream. Rather, the multimedia data is broadcast through the use of discrete lists of objects, some are media files and others are objects relevant to a recipient's multimedia presentation which contain compiled executable files, references to web pages and applets. Subsequent lists are then transmitted asynchronously to all recipients to provide individual recipients with additional multimedia content and presentation. The different multimedia lists and sublists can also be broadcast to specific recipients during multicast operations of a broadcasting Internet server.

The method of discrete multimedia list broadcasting executes on the basis of interactive ready states of Internet recipients, summarized according to the following steps:

a) the broadcasting server periodically creates multimedia lists b) each online receiver periodically indicates an availability state to the broadcaster c) discrete multimedia lists are transmitted to each online receiver in an availability state d) each receiver runs the multimedia lists on their own systems e) steps b) to d) are repeated for a receiver if further multimedia lists are necessary for the broadcast by the broadcasting server for that receiver.

The proposed method has several advantages over existing Internet multimedia broadcast methods. In the case of bit-streaming a principle advantage would be the unnecessary bandwidth requirement to the receiver to maintain a high quality image presentations. This dependency on consistent bandwidth for bit-streaming is contingent on compression methods and dedicated bandwidth to compromise any IP traffic overheads between the broadcaster to receiver.

A second advantage over the bit-streaming approach related to more bandwidth-efficient multicasting in which a single copy of the multimedia content is transmitted to all receivers simultaneously. In this case, the advantage of the proposed method pertains to the capability of broadcast specific multimedia content to specific receivers without any degradation in broadcast quality. The footprint required for sessional broadcast access of individual receivers is an extremely small text list file. Thus thousands of receivers could be accommodated during specific broadcast intervals of several unique multimedia lists using a minimum broadcast server hardware requirement of one or several basic Windows NT servers. The advantages of the proposed method of broadcast over the straight-forward download would be related to access efficiencies obtained from the broadcasting system's determination of availability states of specific receivers, rather than depending on specific receivers to simply download multimedia lists on an ad hoc basis, where sessional access and bandwidth usage to a website for downloading is unsynchronized and unpredictable.

BRIEF DESCRIPTION OF THE DRAWINGS

For a better understanding of the present invention and to show more clearly how it may be carried into effect, reference will now be made, by way of example, to the accompanying drawings which show the preferred embodiment of the present invention and in which.

DETAILED DESCRIPTION OF THE PREFERRED EMBODIMENT

Figure 1:
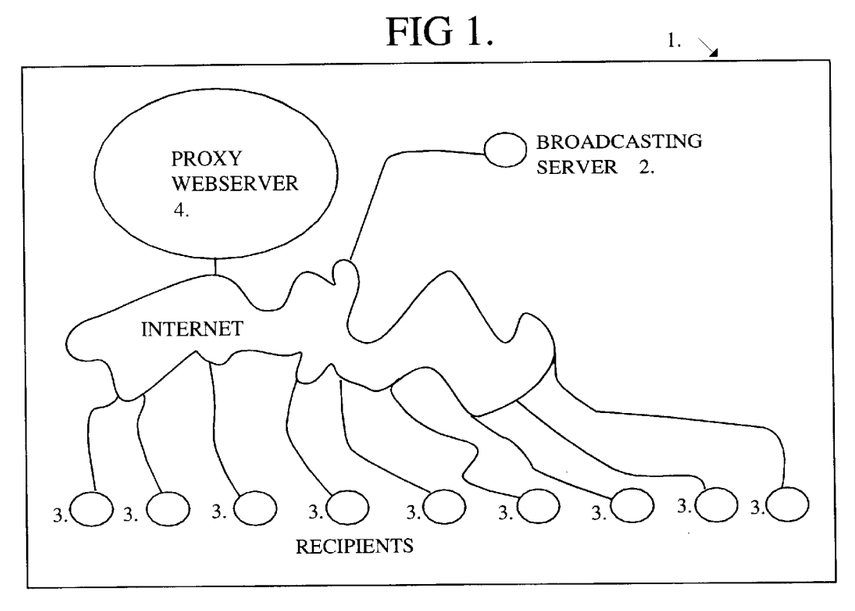
FIG. 1 is a general diagram showing an Internet architecture for a method of discrete multimedia list broadcasting.
Figure 2:
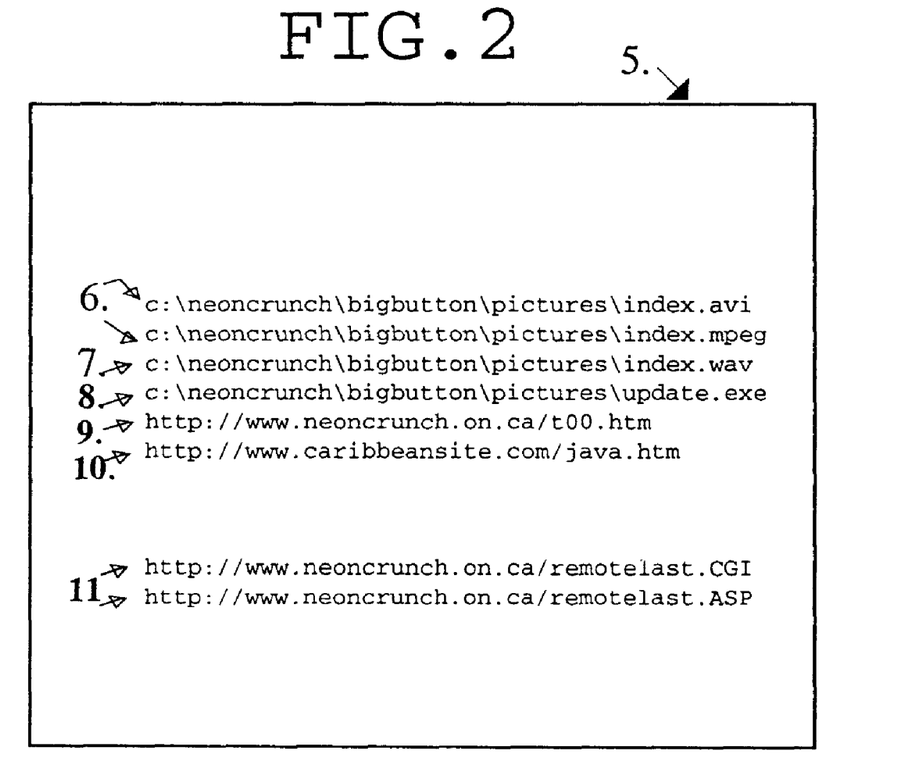
FIG. 2 is an example of a multimedia list of objects created by the broadcasting server for the broadcast method of FIG. 1.

FIG. 1 illustrates example components of a broadcast server system 1 that could be used to transmit multimedia lists from a broadcasting server 2 to a set of online Internet recipients 3. The FIG. 2 multimedia list of objects 5, can include video files 6, sound files 7, application program .exe files 8, HTML pages 9, or HTML pages containing embedded applets 10, as well as special commands, Common Gateway Interface (CGI) scripts and Active Server Page (ASP) scripts 11. These lists of multimedia objects 5 are created by the broadcasting server 2 then transmitted to the proxy webserver 4.

The broadcast server system 2 is a broadcast scheduling and monitoring process that can reside on a machine connected to the Internet, and is not assumed to necessarily reside on a webserver 4. Since the broadcast server can be connected by modem to a webserver 4 which can act as the true point of broadcast to recipients 3 on the Internet, we refer to the relationship between the broadcast server 2 and an associated webserver 4 as one of proxy service. Upon receiving a signal of availability using HTTP from the Receiver System FIG. 7 on a recipient's computer 3, the multimedia list 5 is transmitted using HTTP to the recipient 3. While the multimedia list 5 is being transmitted, the Receiver System FIG. 7 executes a multimedia show 12 on the recipient's computer 3.

Figure 7:
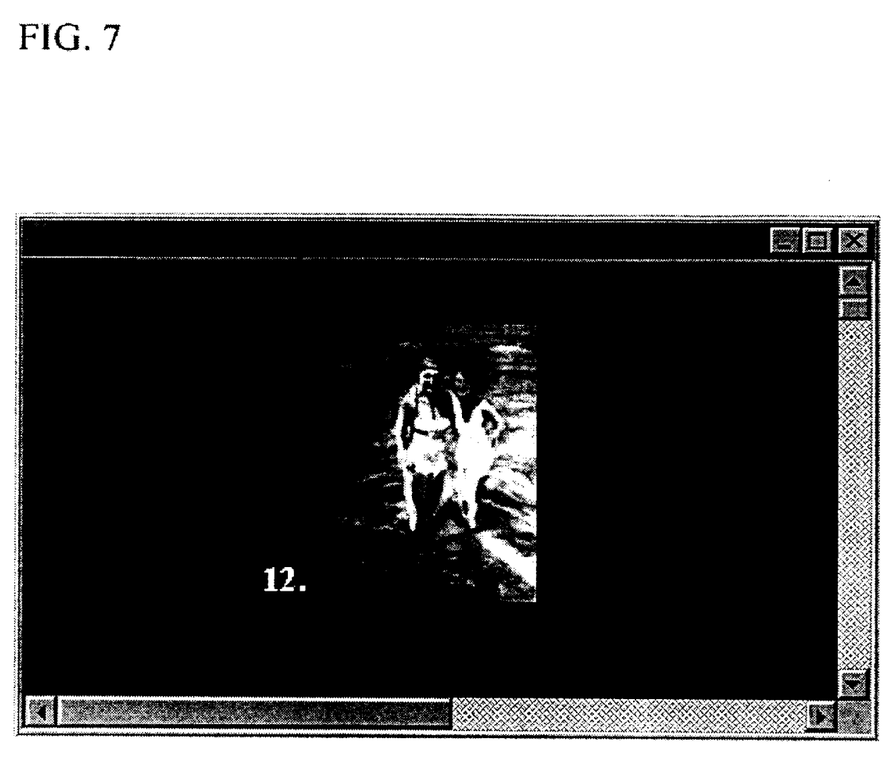
FIG. 7 illustrates the basic display of each recipient's Receiver System for the broadcast method of FIG. 1.

The Receiver System FIG. 7 is essentially a presentation system used to display the object components of a received multimedia list 5 in a show list sequence 12. During a show the Receiver System also signals availability states to the broadcaster 2—this will be discussed later. For presentation purposes, the multimedia list objects 5 are loaded into the memory of the recipient's computer 3, either when they are received during transmission, or off disk if they have been saved by the recipient for an offline replay, and displayed sequentially as a multimedia show. Non-media data which has been received by the recipient, such as applets, may also work in conjunction with the Receiver System software to control or inform the presentation.

Figure 3:
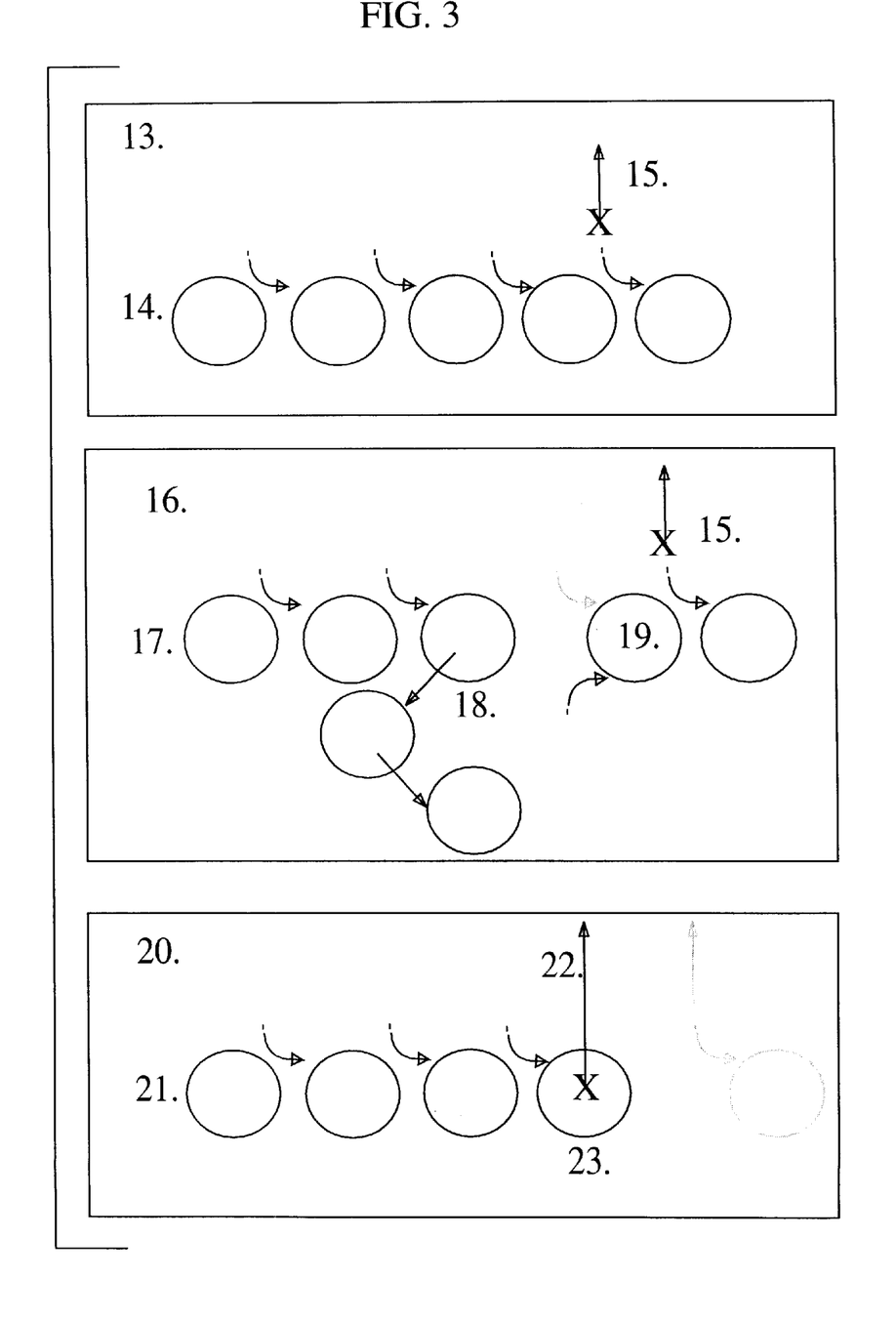
FIG. 3 illustrates three possible variations of recipient availability states for a multimedia list broadcast for the method of FIG. 1.

Fundamentally, each recipient's first availability state exists once a recipient's Receiver System begins to download the first object of the first multimedia list 5 of a particular broadcast from the broadcaster's proxy webserver 4. Thereafter, a new discrete availability state exists for each recipient upon the commencement of the download of each subsequent object in the first, or subsequent, multimedia lists of a particular broadcast to that recipient. A discussion of FIGS. 3–6 will explain this mechanism. FIG. 3 shows three possible variations of recipient availability states for a multimedia list broadcast. The first example 13 illustrates a recipient having received a multimedia list 14, and automatically signalling FIG. 4 the broadcaster 2 of an availability state 15 for further transmissions of any subsequent multimedia lists to complete the recipient's broadcast.

Figure 5:
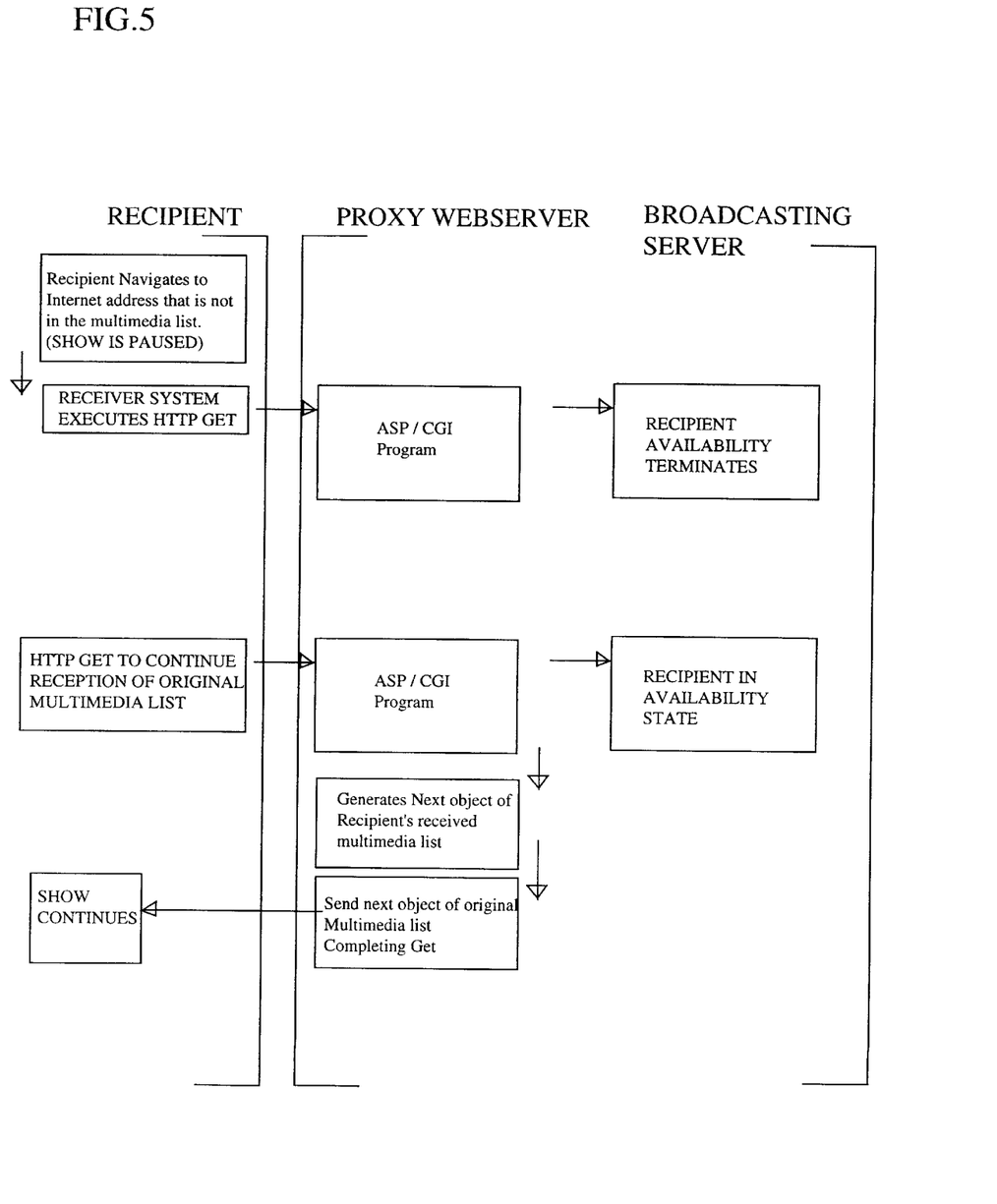
FIG. 5 is a flow diagram illustrating broadcaster/recipient interactions for an interruption of a recipient's availability state by the recipient of a multimedia list for the availability state examples of FIG. 3.

The second example 16 shows an interruption of a recipient's availability state by the recipient, who pauses a locally running multimedia show, resulting from a transmitted multimedia list 17, to interact using HTTP FIG. 5, with an HTML document downloaded 18 from the broadcaster's proxy webserver 4, which has been posited as one of the objects in the multimedia list. Here the availability state of the recipient in question is delayed until he returns to the show and allows it to run to completion, thereby enabling the availability condition for the next object 19 in the original multimedia list 17.

Figure 6:
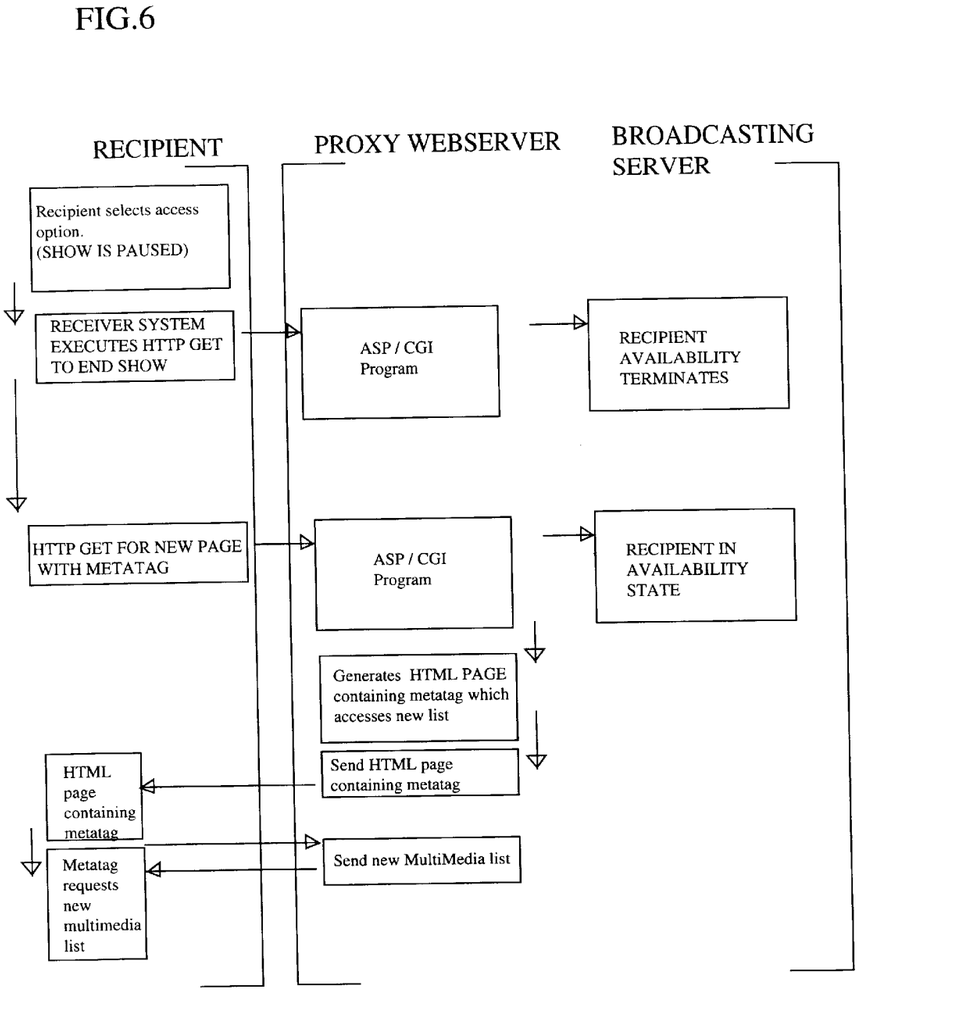
FIG. 6 is a flow diagram illustrating broadcaster/recipient interactions for a recipient's multimedia list interaction request by the individual recipient for the availability state examples of FIG. 3.

The third example 20 shows a recipient interrupting a locally running multimedia list show 21 to interactively request FIG. 6 a multimedia sublist 22 from the broadcaster's proxy webserver 4 that can be hyperlinked from a media object 23 in the current show. Here the recipient is instantiating availability for another multimedia list before the next predetermined multimedia is automatically invoked at the end of his current show.

Figure 4:
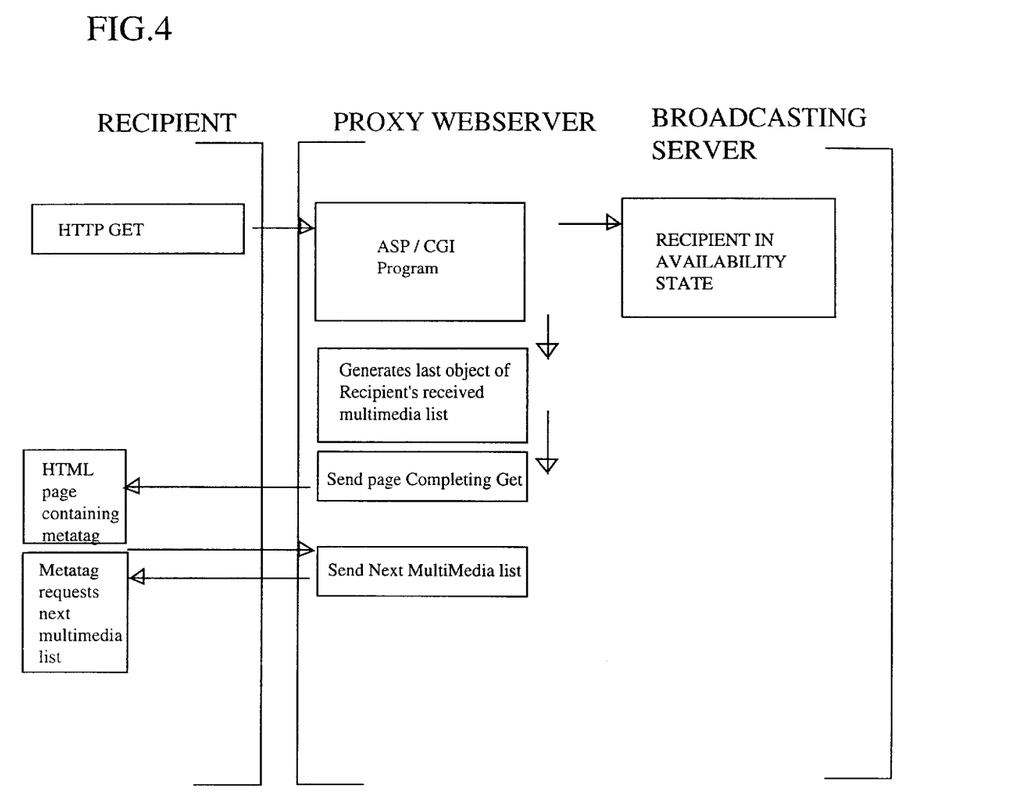
FIG. 4 is a flow diagram illustrating broadcaster/recipient interactions for an automatic multimedia list request by the individual recipient for the next multimedia list of a broadcast for the availability state examples of FIG. 3.

FIG. 4 is a flow diagram showing the recipient having received a multimedia list. Prior to the receipt of the last object of the multimedia list being received, the Receiver System signals the broadcaster of an availability state to obtain the next multimedia list. This is done by executing an HTTP "Get" for the last object, which can be an ASP or CGI program located on the broadcaster's proxy webserver. This program informs the broadcaster of the specific recipient's availability state and generates the last object of the recipient's received multimedia list, which is an HTML page containing a metatag which requests the next multimedia list for the recipient.

FIG. 5 is a flow diagram showing an interruption of a recipient's availability state by the recipient, who pauses a locally running multimedia list show. In this case, the Receiver System detects the recipient's navigation to an Internet address that is not included in the multimedia list, and suppresses further invocations of the availability states through HTTP "Get" actions. When recipient Internet interactions have ceased for a specified duration, the Receiver System invokes an availability state once again by positing another HTTP "Get" to continue the reception of the original multimedia list.

Figure 6A:
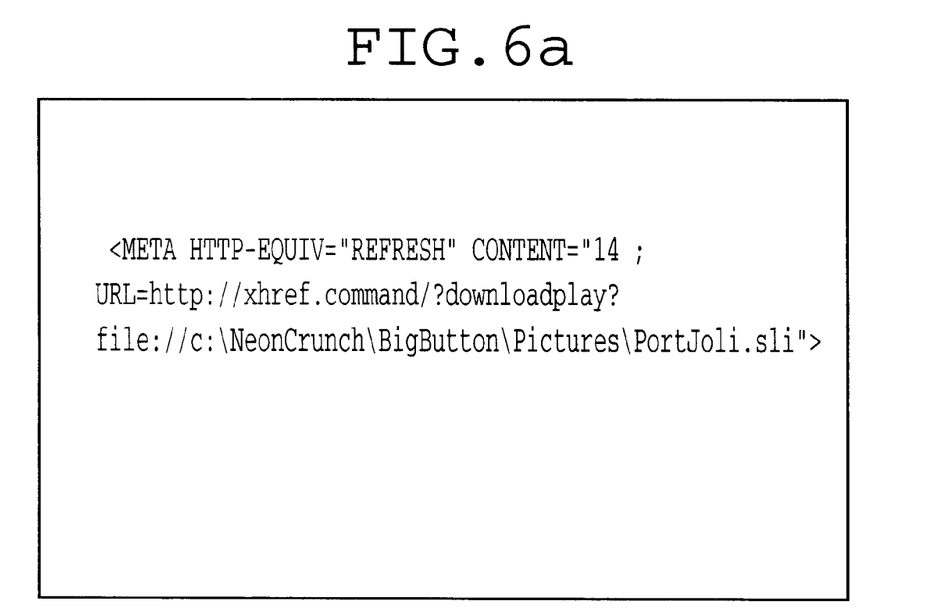
FIG. 6a is an illustration of a metatag used in the process described by FIG. 6.

FIG. 6 is a flow diagram showing a recipient interrupting a locally running multimedia list show to interactively request a new, related multimedia list. Here the recipient has been presented with a new list access option in one of the list objects displayed. When the recipient selects an access option, the Receiver System first uses an HTTP "Get" to a CGI or ASP program on the proxy webserver to cancel availability on the broadcasting server for the current multimedia list. The Receiver System then uses a second HTTP "Get" to a CGI or ASP program on the proxy webserver to obtain an HTML page containing a metatag for the new list. This CGI or ASP program creates an HTML page containing a metatag FIG. 6a, which is then transmitted to the recipient to request the new list.

Figure 8:
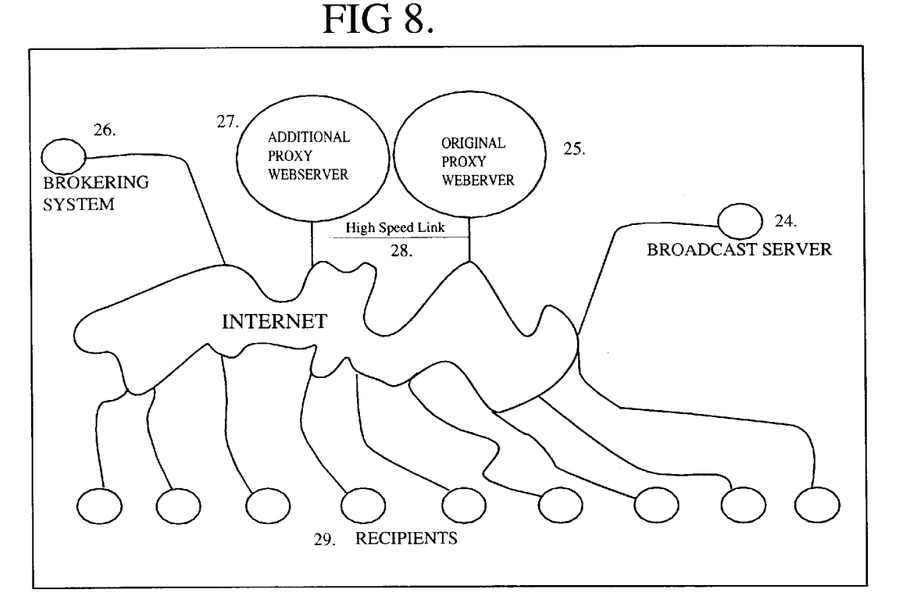
FIG. 8 illustrates a distributed network of multimedia list broadcast servers based on the paradigm of FIG. 1, which use a brokering system to manage access thresholds of multimedia list volumes for timely hand offs of excessive volumes to servers with multimedia list volume accesses far below their thresholds.
Figure 9:
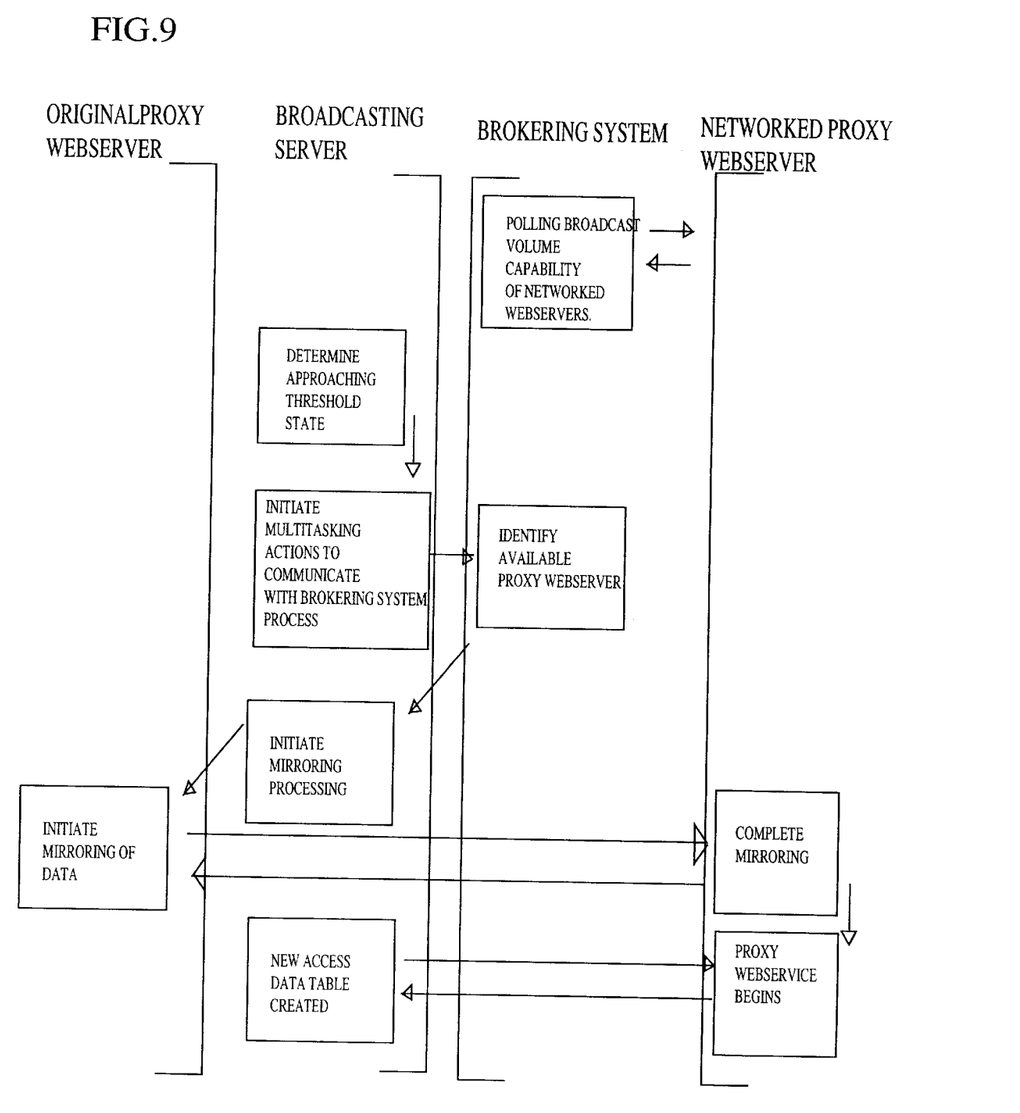
FIG. 9 is a flow diagram illustrating the brokering system and hand off method of FIG. 8.

Recipient signaling of availability states is used by the broadcaster to hand off broadcasting traffic load to a distributed network FIG. 8 of broadcasting servers, based on architecture paradigm FIG. 1. FIG. 9 shows the steps of this hand off process.

The signaling of availability states can be used to update a broadcasting server 24 data table with real time indications of multimedia list access. The database would hence contain the names and data size of the multimedia lists being accessed. A threshold value with respect to accessed multimedia list data volume can be calculated as per original proxy webserver 25 broadcast volume capabilities, and as this value is approached, the broadcasting server 24 can initiate multitasking actions to communicate with a brokering system 26, which continually polls other networked proxy webservers 27 to monitor their volume multimedia list broadcast capabilities. Multitasking actions can then be used to hand off broadcast lists and data to those proxy webservers with multimedia list access volumes significantly below their thresholds at that point in time. This hand off process, allows more available proxy webservers 27 to mirror, or partially mirror, the original proxy webserver 25. Once the mirroring process is complete, the remote proxy webserver is ready for service and signals the broadcasting server to create a new multimedia access data table in order to monitor its threshold value. Since the broadcast list data volumes can be exceptionally large, as in the of video media objects, this hand off capability is optimally supported by high speed Internet links 28 among the dependent proxy webservers 27. The hand off processing is initiated by multitasking processes prior and completed by the time the original server has reached its designated threshold volume, to make the transition imperceptible for recipients 29 accessing multimedia lists.

Figure 10:
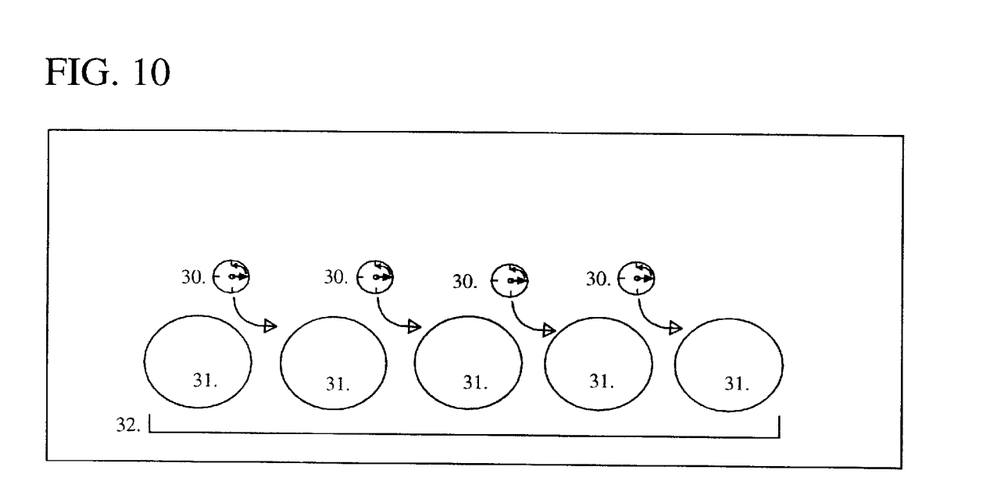
FIG. 10 illustrates a received list of multimedia objects, including display timers for the broadcast method of FIG. 1.

As an option, in FIG. 10, timers 30 are associated with each object 31 in the multimedia list 32 to determine the presentation duration of each object by the Receiver System FIG. 7. Object timers 30 can be transmitted with individual objects by the broadcast host 2, with the object presentation timing set by the broadcaster 2. Hence, in multimedia list transmissions that include timers 30, and when the recipient 3 does not interact with or interrupt the show, the broadcaster 2 can enforce the presentation timing of list object sequences 32, and know the exact duration of each object's display. The timer regulation of the display speed of multimedia list objects 32 allows the broadcaster 2 to optimize the speed of the occurrence of availability states for individual recipients 3, thus optimizing the broadcast of multimedia lists to recipients 3 in general. Also, timed displays can be used to advantage for certain types of objects like sound or video media objects, where the objects themselves require an appropriate display time for purposes of quality and perception.

The foregoing is intended, along with the drawings, to illustrate the preferred embodiment of the invention. Those skilled in the art will be able to devise numerous arrangements which, although not explicitly shown or described herein, embody the principles of the invention and are within their spirit and scope as defined by the following claims.

What is claimed is:

1. A method of Internet multimedia broadcasting wherein multimedia transmission depends on the availability states of recipients, the method comprising:
   (a) creating a multimedia list in a broadcasting server, wherein the multimedia list is specified on a per broadcast per recipient basis and the multimedia list specifies objects to be retrieved by a recipient for a specific broadcast;
   (b) sending an indication of an availability state from a recipient to the broadcasting server;
   (c) transmitting a specified multimedia list from the broadcasting server to the recipient;
   (d) running the multimedia list on the recipient, wherein the step of running further comprises:
      achieving on the recipient an availability state on a per object basis;
      sending an indication of the availability state achieved on a per object basis to the broadcasting server;
      retrieving and running one or more additional multimedia lists associated with the specific broadcast if necessary.

2. The method of claim 1 wherein the recipient retrieves the objects on the multimedia list from one or more proxy webservers and the broadcast server creates a recipient-specific multimedia list specifying the locations of the objects on the proxy webservers such that the multimedia list access and transmission load handling capabilities among all the proxy webservers are optimized.

3. The method of claim 1 wherein the method steps are performed on a per broadcast per recipient basis such that multimedia lists for one or more broadcasts are transmitted to a plurality of recipients.

4. The method of claim 3 wherein the plurality of recipients receive multimedia lists associated with the same specified broadcast.

5. The method of claim 4 wherein the plurality of recipients receive the same multimedia lists.

6. The method of claim 3 wherein the plurality of recipients receive multimedia lists associated with different broadcasts.

7. The method of claim 3 wherein:
   the recipients retrieve the objects on the multimedia lists from a plurality of proxy webservers;
   and further comprising the step of:
      monitoring the availability states of the plurality of recipients and the multimedia list access volume transmission capabilities of the plurality of proxy webservers to determine whether to invoke an object handoff process to the proxy webservers so as to optimize the multimedia list access and transmission load handling capabilities among the proxy webservers.

8. The method of claim 1 wherein the multimedia list contains all or a subset of the following objects: image files, sound files, video files, HTML files, .exe program files, HTML files with embedded applets, programs executable on a server, and timers for controlling the display duration of individual objects.

9. The method of claim 1 wherein the recipient sends an indication of an availability state to the broadcasting server by sending an HTTP "get" for a program executable on a proxy webserver.

10. The method of claim 1:
    wherein the step of transmitting further comprises the steps of:
       uploading the multimedia list from the broadcasting server to a proxy webserver;
       storing the multimedia list in the proxy webserver;
       transmitting the multimedia list to the recipient;
    and wherein the step of running the multimedia list is executed on the recipient by a receiver system software utility, wherein the receiver system software utility retrieves the objects on the multimedia list, displays the objects on the multimedia list as a multimedia show, and sends an indication of each availability state to the broadcasting server;
    and wherein the recipient sends an indication of an availability state to the broadcasting server by sending a message to the proxy webserver, and the proxy webserver in turn sends the indication of the availability state to the broadcasting server.

11. The method of claim 10 wherein the receiver system software utility allows the recipient to:

prevent the automatic transmission of a next multimedia list for the specific broadcast;

pause the specific broadcast by selecting a hyperlink associated with an object on the multimedia list and then resume the specific broadcast after the recipient has stopped interaction activities;

select access to a different broadcast by terminating reception of the multimedia lists associated with the specified broadcast, sending an indication to the broadcasting server of the cancelled availability state, and sending an indication of a new availability state to the broadcasting server associated with the different broadcast.

12. The method of claim 1 wherein the multimedia list includes timers for controlling the display duration of individual objects, wherein the broadcasting server sets the display duration of the timers on a per recipient basis to regulate the speed at which the objects on the multimedia list are displayed at the recipient and to optimize the speed at which the recipient achieves availability states.

13. A method for receiving a multimedia Internet broadcast in a recipient comprising:

receiving from a broadcasting server a multimedia list associated with a specific broadcast, wherein the multimedia list specifies objects to be retrieved for the specific broadcast;

retrieving the objects specified in the multimedia list;

sending an indication of an availability state to the broadcasting server on a per object basis, wherein the availability state begins as each object specified in the multimedia list begins to be received;

displaying the objects specified in the multimedia list as a multimedia show;

and wherein retrieving an object in the multimedia list may cause the receipt of an additional multimedia list associated with the specific broadcast if necessary.

14. The method of claim 13 wherein the recipient retrieves the objects on the multimedia list from one or more proxy webservers and the broadcast server creates a recipient-specific multimedia list specifying the locations of the objects on the proxy webservers such that the multimedia list access and transmission load handling capabilities among all the proxy webservers are optimized.

15. The method of claim 13 wherein the multimedia list contains all or a subset of the following objects: image files, sound files, video files, HTML files, .exe program files, HTML files with embedded applets, programs executable on a server, and timers for controlling the display duration of individual objects.

16. The method of claim 13 wherein the step of sending an indication of an availability state to the broadcasting server comprises sending an HTTP "get" for a program executable on a proxy webserver.

17. The method of claim 13 wherein the steps of receiving, retrieving, signaling, and displaying executed by a receiver system software utility.

18. The method of claim 17 wherein the receiver system software utility allows the recipient to:

prevent the automatic transmission of a next multimedia list for the specific broadcast;

pause the specific broadcast by selecting a hyperlink associated with an object on the multimedia list and then resume the specific broadcast after the recipient has stopped interaction activities;

select access to a different broadcast by terminating reception of the multimedia lists associated with the specified broadcast, sending an indication to the broadcasting server of the cancelled availability state, and sending an indication of a new availability state to the broadcasting server associated with the different broadcast.

19. The method of claim 13 wherein the multimedia list includes timers for controlling the display duration of individual objects, wherein the display duration of the timers are set by the broadcasting server on a per recipient basis to regulate the speed at which the objects on the multimedia list are displayed at the recipient and to optimize the speed at which the recipient achieves availability states.

* * * * *